(12) United States Patent
Zhang et al.

(10) Patent No.: US 11,979,328 B1
(45) Date of Patent: May 7, 2024

(54) TRAFFIC FLOW CLASSIFIERS AND ASSOCIATED METHODS

(71) Applicant: Cable Television Laboratories, Inc., Louisville, CO (US)

(72) Inventors: Junwen Zhang, Broomfield, CO (US); Bernardo Huberman, Palo Alto, CA (US); Jingjie Zhu, Erie, CO (US); Karthik Sundaresan, Boulder, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 459 days.

(21) Appl. No.: 17/242,535

(22) Filed: Apr. 28, 2021

Related U.S. Application Data

(60) Provisional application No. 63/039,262, filed on Jun. 15, 2020, provisional application No. 63/016,476, filed on Apr. 28, 2020.

(51) Int. Cl.
*H04L 12/851* (2013.01)
*G06N 3/04* (2023.01)
*G06N 3/08* (2023.01)
*H04L 47/2441* (2022.01)

(52) U.S. Cl.
CPC .......... *H04L 47/2441* (2013.01); *G06N 3/04* (2013.01); *G06N 3/08* (2013.01)

(58) Field of Classification Search
CPC ......... H04L 47/2441; G06N 3/04; G06N 3/08
USPC .......................................................... 370/252
See application file for complete search history.

(56) References Cited

U.S. PATENT DOCUMENTS

| | | | |
|---|---|---|---|
| 2006/0126509 A1* | 6/2006 | Abi-Nassif | H04L 47/10 370/235 |
| 2013/0148513 A1* | 6/2013 | Szabo | H04L 41/142 370/252 |
| 2016/0171514 A1* | 6/2016 | Frank | G06Q 30/02 705/7.29 |
| 2020/0145456 A1* | 5/2020 | Fugate | H04L 63/0464 |
| 2020/0171671 A1* | 6/2020 | Huang | B25J 9/0084 |
| 2020/0322227 A1* | 10/2020 | Janakiraman | H04L 41/147 |
| 2022/0363265 A1* | 11/2022 | Gray | B60W 60/0016 |

* cited by examiner

*Primary Examiner* — Christopher M Crutchfield
*Assistant Examiner* — Jean F Voltaire
(74) *Attorney, Agent, or Firm* — PdZ Patent Law, PLLC

(57) ABSTRACT

A method for traffic flow classification in a communication network includes (1) identifying a traffic flow in communication network traffic, (2) extracting features of the traffic flow, and (3) using a machine learning model, classifying the traffic flow at least partially based on the features of the traffic flow. The features of the traffic flow include, for example, a distribution of packet size values of a sliding window sample of the traffic flow, a distribution of inter-arrival time values of a sliding window sample of the traffic flow, standard deviation of data packet size, average of data packet size, standard deviation of data packet inter-arrival time, and average of data packet inter-arrival time.

13 Claims, 7 Drawing Sheets

US 11,979,328 B1

TRAFFIC FLOW CLASSIFIERS AND ASSOCIATED METHODS

RELATED APPLICATIONS

This application claims benefit of priority to (a) U.S. Provisional Patent Application Ser. No. 63/016,476, filed on Apr. 28, 2020, and (b) U.S. Provisional Patent Application Ser. No. 63/039,262, filed on Jun. 15, 2020.

BACKGROUND

A traffic flow in a communication network is a sequence of data packets flowing from one node to another node. A traffic flow may be classified according to the type of data it carries. For example, a traffic flow could be classified as a gaming traffic flow, a web browsing traffic flow, an upstream video traffic flow, a downstream video traffic flow, a video conference traffic flow, etc., depending on the application generating the traffic flow. Real-time traffic flow classification is beneficial in many wireline and wireless communication network applications, such as for dynamic resource application, dynamic quality of service (QoS) management, traffic flow prioritization, security monitoring, pricing, and virtualization in a software defined network (SDN). Traffic flow classification also benefits communication network operators by giving them additional visibility into their networks, such as to facilitate efficient network planning and/or for intelligent network management.

QoS management can alternatively be accomplished without traffic flow classification by marking data packets according to their QoS requirements. QoS service mechanisms can then determine respective QoS service requirements of data packets from their markings. For example, games and video conferencing applications may mark their data packets as requiring low latency handling. However, data packet marking is not supported by some applications. Additionally, data packet markings may be modified or "bleached" during communication network transmission, such that the markings cannot be read by QoS service mechanisms. Therefore, data packet marking may not necessarily achieve robust QoS management.

DETAILED DESCRIPTION OF THE EMBODIMENTS

One conventional approach to traffic flow classification is to classify a network traffic flow based on its corresponding port number. While classification based on port number is simple to implement, it is becoming increasingly inaccurate due to growth in number of applications that do not use standard registered port numbers. Additionally, some applications, such as real-time video streaming applications, may dynamically allocate port numbers, such that their network traffic flows cannot be determined based on port number.

Another conventional approach to traffic flow classification is to determine traffic flow type by inspecting data packet payload, frequently referred to as deep pack inspection. Although deep packet inspection may achieve high accuracy, it is complex to implement, and deep packet inspection may therefore not be practical to implement in low-cost hardware, particularly on a real-time basis. Additionally, deep packet inspection cannot classify encrypted network traffic. Furthermore, deep packet inspection may raise privacy issues.

Disclosed herein are traffic flow classifiers and associated methods which at least partially overcome the above-discussed problems associated with conventional traffic flow classification approaches. The new traffic flow classifiers advantageously use machine learning technology to classify a traffic flow in real-time, or in substantially real-time, from network traffic flow features, such as data packet size and data packet inter-arrival time. Advantageously, the new traffic flow classifiers do not require port number or payload information for classification. Accordingly, certain embodiments are protocol independent and are payload independent. Additionally, the new traffic classifiers' use of machine learning technology to classify a traffic flow advantageously promotes low computational complexity, short processing time, and low cost.

The new traffic flow classifiers and associated methods have numerous potential applications. For example, some embodiments can be used at a user's premises, such as to enable the user to optimize a network at their premises, e.g., to implement robust QoS, to identify data-intensive applications, and/or to adapt a wireless communication network to its use and/or environment. As another example, some embodiments can be used at a business, such as to help prioritize important network traffic, e.g., mission-critical network traffic or customer-facing network traffic, over other communication network traffic. As yet another example, certain embodiments may be used by a communication network operator, such as at a hub, headend, central office, satellite ground station, cellular transceiver site, server, or other network node, to provide the communication network operator additional visibility into their communication network's operation, such as for network planning, network load balancing, and/or network troubleshooting.

Figure 1:
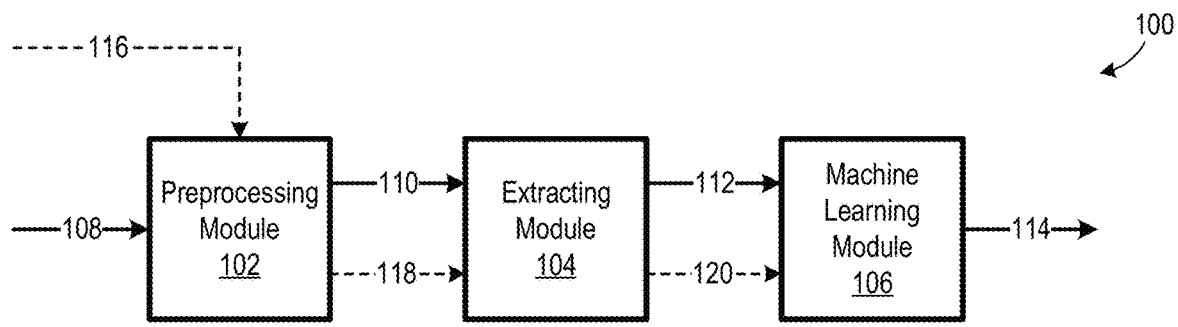
FIG. 1 is a block diagram of a traffic flow classifier, according to an embodiment.
Figure 2:
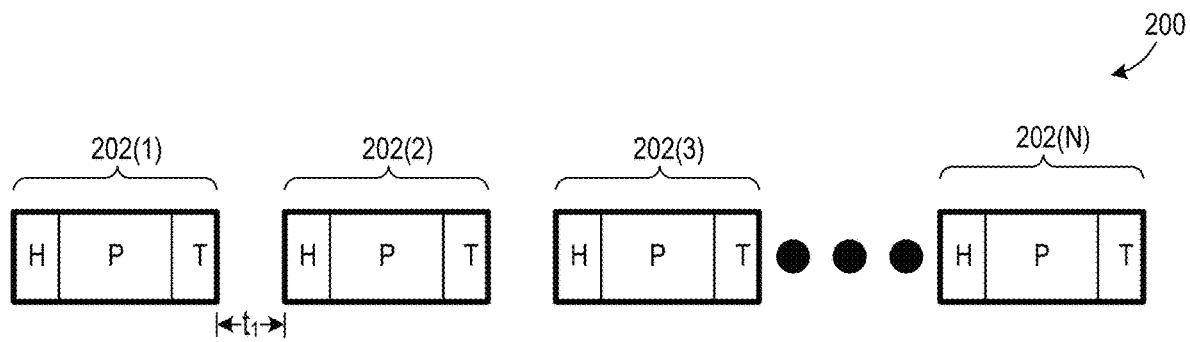
FIG. 2 is a block diagram of an example traffic flow.

FIG. 1 is a block diagram of a traffic flow classifier 100, which is one embodiment of the new traffic flow classifiers disclosed herein. Traffic flow classifier 100 includes a preprocessing module 102, an extracting module 104, and a machine learning module 106. Preprocessing module 102 is configured to receive communication network traffic 108 and identify one or more traffic flows 110 therein. Each traffic flow 110 is a sequence of data packets associated with a common application, and each traffic flow 110 may be either a downlink traffic flow or an uplink traffic flow. For example, FIG. 2 is a block diagram of a traffic flow 200, which is one example embodiment of a traffic flow 110 instance. Traffic flow 200 includes a sequence of N data packets 202, where N is an integer greater than one. In this document, specific instances of an item may be referred to by use of a numeral in parentheses (e.g., data packet 202(1)) while numerals without parentheses refer to any such item (e.g., data packets 202). Each data packet 202 is illustrated as including a respective header (H), payload (P), and trailer (T), although the configuration of data packets 202 may vary without departing from the scope hereof.

Preprocessing module 102 is configured to identify traffic flow 110 from a plurality of data packets having a common characteristic, such as common information in headers of the data packets. For example, some embodiments of preprocessing module 102 are configured to identify a traffic flow 110 from a plurality of data packets having a common source address (e.g., a common source Internet Protocol address), a common destination address (e.g., a common destination Internet Protocol address), a common source port, a common destination port and/or a common protocol. Preprocessing module 102 is optionally configured to identify an end of traffic flow 110, for example, in response to failure to receive an additional data packet of the traffic flow within a predetermined amount of time after receiving the most-recent data packet of the traffic flow.

Extracting module 104 is configured to extract features 112 of traffic flows 110, for use as input to machine learning module 106. In some embodiments, features 112 include, or are based on, size of data packets of traffic flow 110 and inter-arrival time of data packets of traffic flow 110. Additionally, in some embodiments features 112 include (1) size of data packets of a downlink traffic flow, (2) inter-arrival time of the data packets of the downlink traffic flow, (3) size of data packets of an uplink traffic flow, where the uplink data flow is related to the downlink traffic flow, such as being associated with the same application as the downlink data flow, and (4) inter-arrival time of the data packets of the uplink traffic flow. Inter-arrival time is a time between arrival of sequential data packets in a traffic flow 110. For example, the inter-arrival time between data packets 202(1) and 202(2) in traffic flow 200 of FIG. 2 is ti.

Machine learning module 106 is configured to classify traffic flows 110 at least partially based on features 112 using a machine learning model. In some embodiments, machine learning module 106 is configured to concurrently classify a downlink traffic flow 110 and a related uplink traffic flow 110 at least partially based on features of both traffic flows. Machine learning module 106 outputs classification data 114 identifying a type of one or more traffic flows 110. By way of example and not limitation, the classification data 114 may indicate that a traffic flow 110 is a gaming traffic flow, a web browsing traffic flow, an upstream video traffic flow, a downstream video traffic flow, or a video conference traffic flow. Classification data 114 optionally further indicates a confidence of the classification determined by machine learning module 106 or a probability that the classification is correct. In some embodiments, machine learning module 106 includes a machine learning model in the form a neural network, such as a feedforward neural network or a convolutional neural network, which receives features 112 and processes the features to output classification data 114. However, machine learning module 106 is not limited to including either of the aforementioned neural networks, or even including a neural network at all, as long as machine learning module 106 is capable of using a machine learning model to generate classification data 114 from features 112 of one or more traffic flows 110.

Traffic flow classifier 100 is optionally further configured to receive training data 116 for training machine learning module 106. Training data 116 includes, for example, real communication network traffic that is labeled with its respective classification. In embodiments where traffic classifier 100 is configured to receive training data 116, preprocessing module 102 is configured to identify one or more traffic flows 118 analogous to traffic flow 110, and extracting module 104 is configured to extract features 120 of traffic flows 118, where features 120 are analogous to features 112 but further include labels classifying underlying traffic flows 118. Machine learning module 106 is configured to train itself from features 120. For example, in embodiments where machine learning module 106 includes a neural network, the neural network is configured train itself from features 120, optionally using backpropagation and/or other training techniques.

Certain embodiments of machine learning module 106 are configured to determine that training is complete in response to a loss function being less than a maximum threshold value. Certain embodiments of machine learning module 106 that include a convolutional neural network with a Softmax output activation function are configured to determine the loss function based on cross-entropy, such as using EQN. 1 below, where x is a convolutional network score, p is an index corresponding to the target classification of the traffic flow, and C represents the number of possible classifications of the traffic flow:

$$\text{loss}(x, p) = -x_p + \log\left(\sum\nolimits_{j=1}^{C} e^{x_j}\right) \quad \text{EQN. 1}$$

Although preprocessing module 102, extracting module 104, and machine learning module 106 are depicted in FIG. 1 as being separate elements, two or more of these modules may be at least partially combined without departing from the scope hereof. In some embodiments, preprocessing module 102, extracting module 104, and machine learning module 106 are implemented by analog and/or digital electronics. Additionally, one or more of preprocessing module 102, extracting module 104, and machine learning module 106 may be at least partially implemented by one or more processors executing instructions stored in one or more memories.

Figure 3:
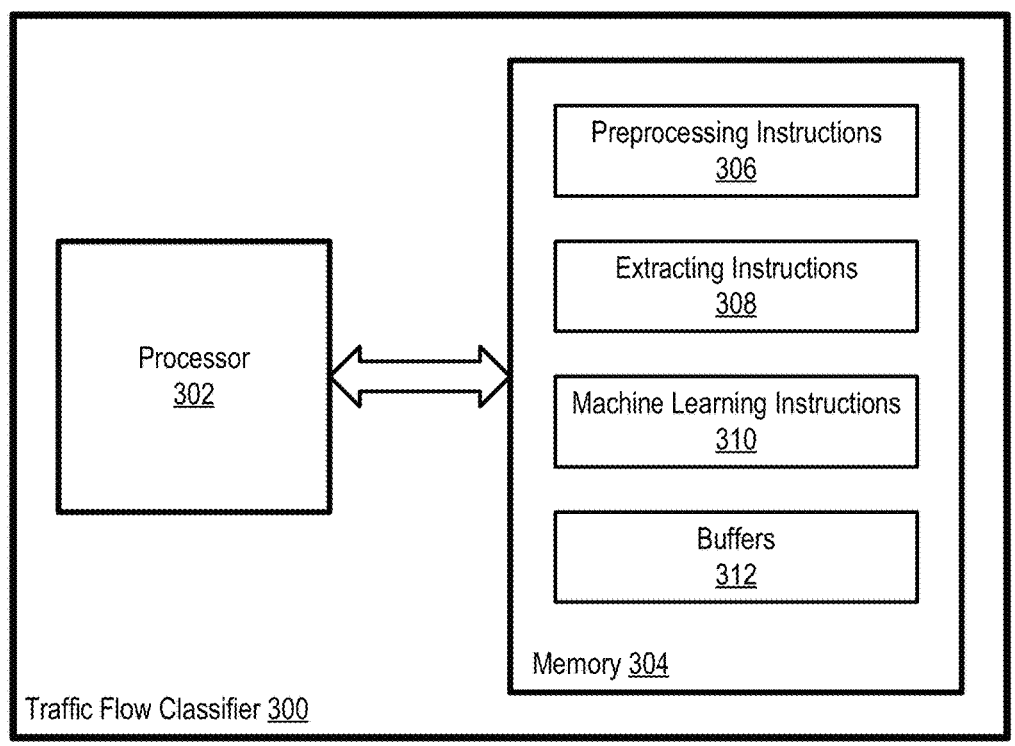
FIG. 3 is a block diagram of an embodiment of the FIG. 1 traffic flow classifier including a processor and a memory.

For example, FIG. 3 is a block diagram of a traffic flow classifier 300, which is one embodiment of traffic flow classifier 100 where its constituent elements are implemented by a processor executing instructions stored in a memory. Traffic flow classifier 300 includes a processor 302 communicatively coupled to a memory 304. Memory 304 includes the following instructions, such as in the form of software and/or firmware, stored therein: (1) preprocessing instructions 306, (2) extracting instructions 308, and (3) machine learning instructions 310. Memory 304 additionally includes one or more buffers 312, such as for temporary data storage. Processor 302 is configured to execute preprocessing instructions 306 to implement preprocessing module 102, and processor 302 is configured to execute extracting instructions 308 to implement extracting module 104. Additionally, processor 302 is configured to execute machine learning instructions 310 to implement machine learning module 106. Traffic flow classifier 300 could be modified as long as it includes one or more processors and one or more memories capable of storing instructions. For example, an alternate embodiment of traffic flow classifier 300 includes a respective processor and memory pair configured to implement each of preprocessing module 102, extracting module 104, and machine learning module 106.

Figure 4:
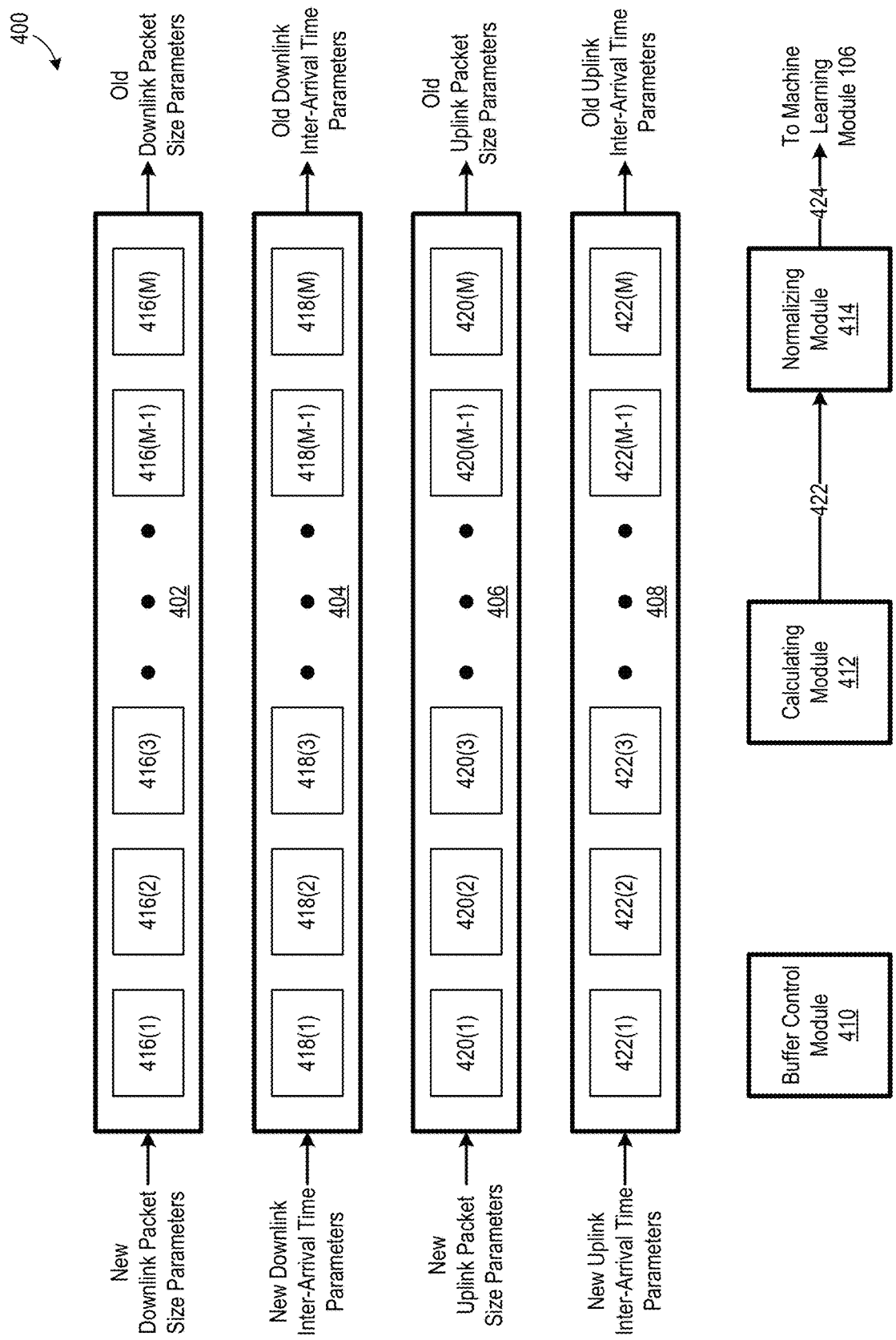
FIG. 4 is a block diagram of an extracting module configured to determine statistical values of sliding window samples of traffic flows, according to an embodiment.
Figure 5:
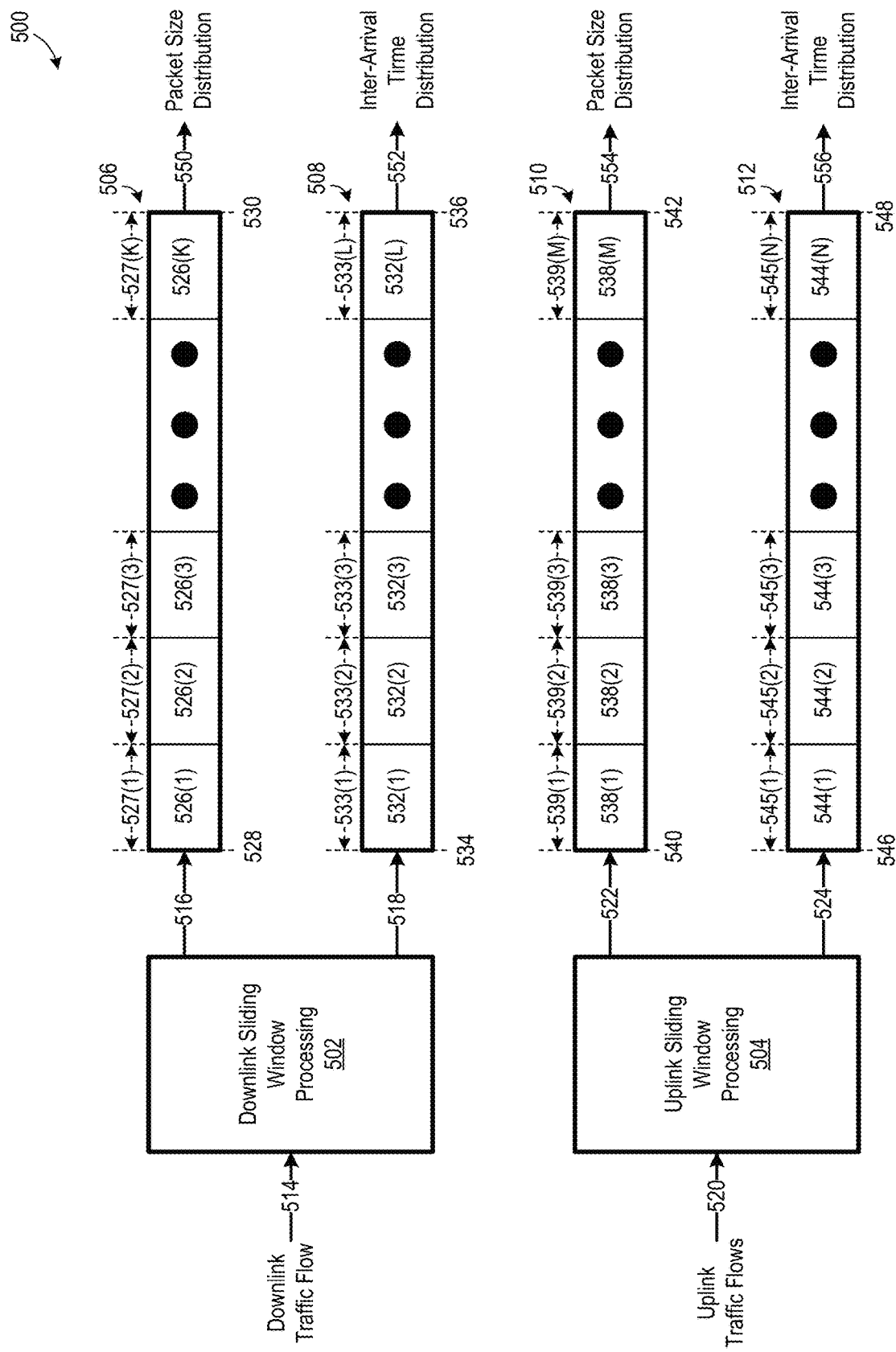
FIG. 5 is a block diagram of an extracting module configured to determine distributions of traffic flow features, according to an embodiment.
Figure 8:
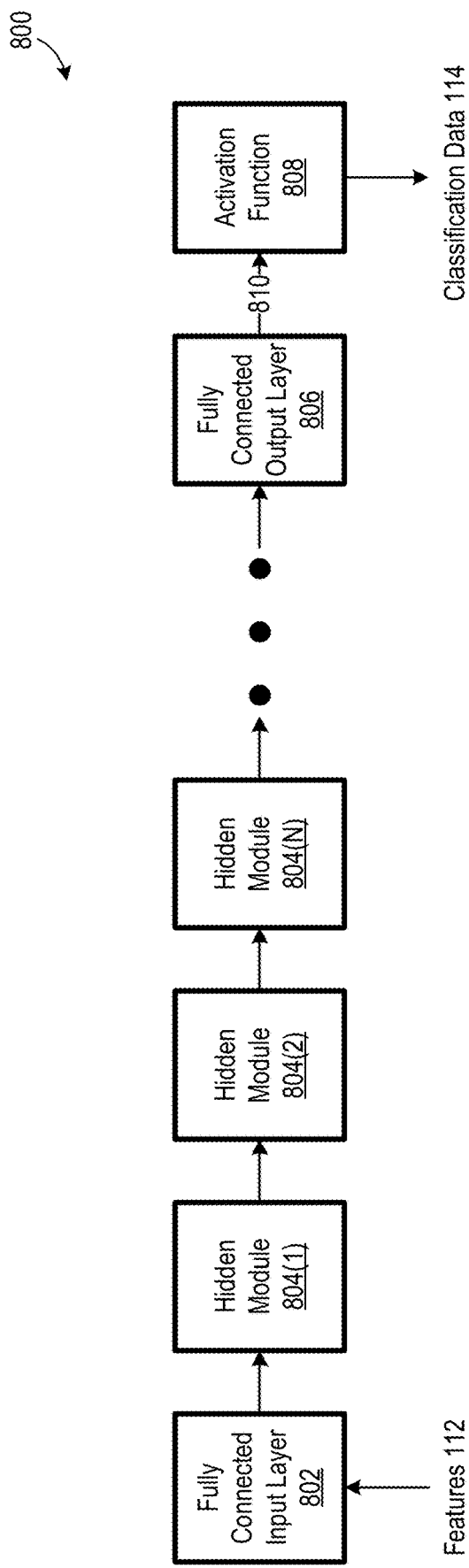
FIG. 8 is a block diagram of one possible embodiment of a machine learning module of the FIG. 1 traffic flow classifier.
Figure 9:
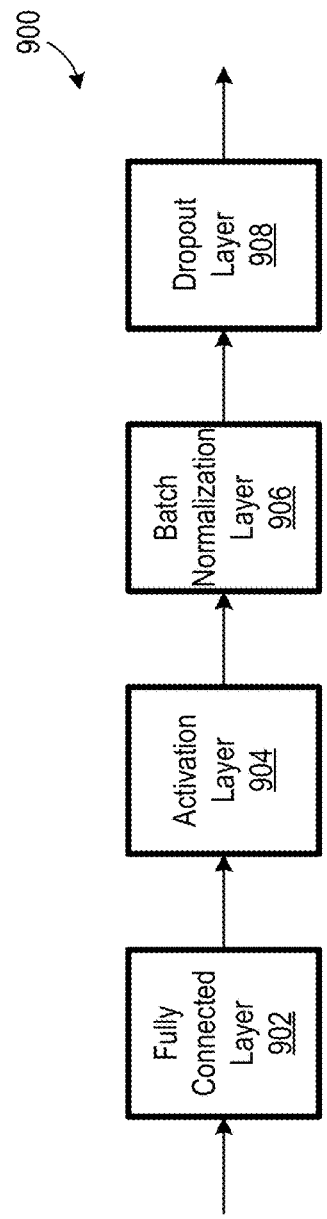
FIG. 9 is a block diagram of one possible embodiment of a hidden module of the FIG. 8 machine learning module.

Discussed below with respect to FIGS. 4 and 5 are example embodiments of extracting module 104, and discussed below with respect to FIGS. 8 and 9 are example embodiments of machine learning module 106. However, extracting module 104 and machine learning module 106 are not limited to these example embodiments.

FIG. 4 is a block diagram of an extracting module 400, which is one possible embodiment of extracting module 104 of FIG. 1. Extracting module 400 includes buffers 402, 404, 406, and 408, a buffer control module 410, a calculating module 412, and a normalizing module 414. In some embodiments, the elements of extracting module 400 are implemented by a processor and a memory, where the processor executes instructions stored in the memory to perform the functions of extracting module 400. For example, in some embodiments of extracting module 400, buffers 402-408 are implemented by buffers 312 (FIG. 3), and buffer control module 410, calculating module 412, and normalizing module 414 are each implemented by processor 302 executing extracting instructions 308 (FIG. 3).

Buffer 402 is configured to hold M downlink packet size parameters 416, where M is an integer greater than one. New downlink packet size parameters 416 enter buffer 402 on the left, progress through buffer 402 from left to right, and finally exit buffer 402 as old downlink packet size parameters 416. Accordingly, buffer 402 holds a sliding window sample of downlink packet size parameters 416, where the contents of the sliding window change when a new packet enters the buffer and an old packet exits the buffer. Each downlink packet size parameter 416 represents a size of a corresponding data packet of a downlink data flow 110 instance. Buffers 404-408 are similar to buffer 402, but buffers 404-408 hold different parameters. Specifically, buffer 404 holds a sliding window sample of downlink inter-arrival time parameters 418, where each downlink inter-arrival time parameter 418 represents difference between arrival time of two sequential data packets of the same downlink data flow instance 110 as that discussed above with respect to buffer 402. Buffer 406 holds a sliding window sample of uplink packet size parameters 420, where each uplink data packet size parameter represents a size of a corresponding data packet of an uplink data flow 110 instance that is related to the downlink data flow 110 instance discussed with above respect to buffers 402 and 404. Buffer 408 holds a sliding window sample of uplink inter-arrival time parameters 422, where each uplink inter-arrival time parameter 422 represents difference between arrival time of two sequential data packets of the same uplink data flow instance 110 as that discussed above with respect to buffer 406.

FIG. 4 illustrates each of buffers 402, 404, 406, and 408 as holding the same number parameters, i.e., M parameters, so that the buffers hold respective sliding widow samples of common length. However, one or more of buffers 402, 404, 406, and 408 could be modified to have a different length so that two or more of the buffers hold sliding window samples of different respective lengths. For example, in an alternate embodiment of extracting module 400, buffers 402 and 406 hold M parameters, while buffers 404 and 408 hold L parameters, where L is a positive integer that is different from M.

Buffer control module 410 is configured to establish, maintain, and tear-down buffers 402, 404, 406, and 408. For example, buffer control module 410 is configured to establish buffers 402 and 404 in response to preprocessing module 102 identifying a downlink traffic flow 110 instance, and buffer control module 410 is also configured to tear-down buffers 402 and 404 in response to the traffic flow ending. Buffer control module 410 is optionally configured to identify an end of a traffic flow 110 instance, for example, in response to failure to receive an additional data packet of the traffic flow within a predetermined amount of time after receiving the most-recent data packet of the traffic flow. Buffer control module 410 is also configured to identify parameters 416, 418, 420, and 422 from traffic flows 110.

Calculating module 412 is configured to determine raw statistical values 422 of the sliding window samples of buffers 402, 404, 406, and 408. For example, in some embodiments, calculating module 412 is configured to determine the following raw statistical values 422: (1) sliding window standard deviation of downlink data packet size from buffer 402, (2) sliding window average of downlink data packet size from buffer 402, (3) sliding window standard deviation of downlink data packet inter-arrival time from buffer 404, (4) sliding window average of downlink data packet inter-arrival time from buffer 404, (5) sliding window standard deviation of uplink data packet size from buffer 406, (6) sliding window average of uplink data packet size from buffer 406, (7) sliding window standard deviation of uplink data packet inter-arrival time from buffer 408, and (8) sliding window average of uplink data packet inter-arrival time from buffer 408. Some embodiments of calculating module 412 are configured to delay determining raw statistical values 422 until corresponding buffers 402, 404, 406, and 408 include a sufficient number of parameters, e.g., at least a minimum threshold number of parameters. For example, calculating module 412 may be configured to delay generating a sliding window average of downlink data packet size until buffer 402 includes at least a threshold number of downlink packet size parameters 416.

Normalizing module 414 is configured to normalize raw statistical values 422 to yield normalized statistical values 424, where normalized statistical values 424 are an embodiment of features 112 of FIG. 1. For example, some embodiments of normalizing module 414 are configured to yield the following normalized statistical values 424: (1) normalized sliding window standard deviation of downlink data packet size from buffer 402, (2) normalized sliding window average of downlink data packet size from buffer 402, (3) normalized sliding window standard deviation of downlink data packet inter-arrival time from buffer 404, (4) normalized sliding window average of downlink data packet inter-arrival time from buffer 404, (5) normalized sliding window standard deviation of uplink data packet size from buffer 406, (6) normalized sliding window average of uplink data packet size from buffer 406, (7) sliding window standard deviation of uplink data packet inter-arrival time from buffer 408, and (8) normalized sliding window average of uplink data packet inter-arrival time from buffer 408.

Normalizing module 414 is configured to normalize raw statistic values 422, for example, by dividing each raw statistical value 422 by a maximum observed value of the class of statistical values. For example, each value of standard deviation of downlink data packet size may be normalized by dividing the value by a maximum observed standard deviation of downlink data packet size.

Normalized statistical values 424 include both downlink and uplink statistical values, as discussed above. However, extracting module 400 could be modified so that it extracts normalized statistical values 424 from only a downlink traffic flow or from only an uplink traffic flow, instead of from both of a downlink traffic flow and an uplink traffic flow. In these embodiments, machine learning module 106 is configured to classify a traffic flow from only downlink statistical values or uplink statistical values, instead of from both uplink and downlink statistical values. Additionally, extracting module 400 may be modified to extract additional statistical parameters, fewer statistical parameters, or alternative statistical parameters, than those discussed above.

FIG. 5 is a block diagram of an extracting module 500, which is another possible embodiment of extracting module 104 of FIG. 1. Extracting module 500 includes a downlink sliding window processing module 502, an uplink sliding window processing module 504, and buffers 506, 508, 510, and 512. In some embodiments, the elements of extracting module 500 are implemented by a processor and a memory, where the processor executes instructions stored in the memory to perform the functions of extracting module 500. For example, in some embodiments of extracting module 500, buffers 506-512 are implemented by buffers 312 (FIG. 3), and downlink sliding window processing module 502 and uplink sliding window processing module 504 are each implemented by processor 302 executing extracting instructions 308 (FIG. 3).

Downlink sliding window processing module 502 is configured to (1) receive a downlink traffic flow 514, where downlink traffic flow 514 is an instance of a traffic flow 110 of FIG. 1, (2) obtain downlink data packet size sample values 516 from traffic flow 514, and (3) obtain downlink data packet inter-arrival time sample values 518 from traffic flow 514. Similarly, uplink sliding window processing module 504 is configured to (1) receive an uplink traffic flow 520, where the uplink traffic flow 520 is an instance of a traffic flow 110 of FIG. 1, (2) obtain uplink data packet size sample values 522 from traffic flow 520, and (3) obtain uplink data packet inter-arrival time sample values 524 of traffic flow 520. Downlink sliding window processing module 502 is communicatively coupled to each of buffers 506 and 508, and uplink sliding window processing module 504 is communicatively coupled to each of buffers 510 and 512.

Each buffer 506, 508, 510, and 512 is configured to hold a plurality of bins. Specifically, buffer 506 is configured to hold K bins 526, where K is an integer greater than one. Each bin 526 represents a respective range of downlink data packet sizes. Bins 526 continuously span a range from a minimum packet size value 528 to a maximum packet size value 530, and bins 526 are non-overlapping. Each bin 526 has a respective width 527. Buffer 508 is configured to hold L bins 532, where L is an integer greater than one. Each bin 532 represents a respective range of downlink inter-arrival times. Bins 532 continuously span a range from a minimum inter-arrival time value 534 to a maximum inter-arrival time 536 value, and bins 532 are non-overlapping. Buffer 510 is configured to hold M bins 538, where M is an integer greater than one. Each bin 538 represents a respective range of uplink data packet sizes. Bins 538 continuously span a range from a minimum packet size value 540 to a maximum packet size value 542, and bins 538 are non-overlapping. Each bin 538 has a respective width 539. Buffer 512 is configured to hold N bins 544, where N is an integer greater than one. Each bin 544 represents a respective range of uplink inter-arrival times. Bins 544 continuously span a range from a minimum inter-arrival time value 546 to a maximum inter-arrival time 548 value, and bins 544 are non-overlapping. Each bin 544 has a respective width 545. In some embodiments, each of K, L, M, and N are a common integer, while in some other embodiments, at least two of K, L, M, and N are different respective integers.

FIG. 5 depicts bin widths 527, 533, 539, and 545 are being uniform. However, bin widths could instead vary within a given buffer 506, 508, 510, or 512. For example, bin widths 527 within buffer 506 may be non-uniform instead of being uniform. Additionally, bin widths may vary between buffers 506, 508, 510, and 512. In some embodiments, bins within a given buffer 506, 508, 510, or 512 have respective widths that logarithmically span a starting value of the buffer and an ending value of the buffer. For example, in some embodiments of buffer 506, bins widths 527 logarithmically span minimum packet size value 528 and maximum packet size 530 value, such that width 527(2) is greater than width 527(1), width 527(3) is greater than width 527(2), and so on. Furthermore, some embodiments of extracting module 500 are configured to automatically determine widths 527, 533, 539, and 545, e.g., such that the widths are uniformly distributed or are logarithmically distributed, depending on the implementation of extracting module 500.

Table 1 below lists possible intervals of buffers 506 and 510, and Table 2 below lists possible intervals of buffers 508 and 512. It should be appreciated, though, that the intervals of Tables 1 and 2 and provided by way of example and not by way of limitation. Accordingly, the number of intervals of buffers 506, 508, 510, 512, as well as the interval values of each buffer 506, 508, 510, 512, may vary without departing from the scope hereof.

Each interval in Table 1 and Table 2 represents a boundary of one or more bins of its respective buffer. Whether a particular interval is included in a bin, or just marks a boundary of the bin, is implementation dependent. For example, in one embodiment of buffer 506 having the intervals of Table 1, bin 526(1) may represent packet size values greater than or equal to zero but less than 64 bytes, bin 526(2) may represent packet size values greater than or equal to 64 bytes but less than 128 bytes, and so on. Alternately, in an embodiment of buffer 506 having the intervals of Table 1, bin 526(1) may represent packet size values greater than zero but less than or equal to 64 bytes, bin 526(2) may represent packet size values greater than 64 bytes but less than or equal to 128 bytes, and so on. As another example, in an embodiment of buffer 508 having the intervals of Table 2, bin 532(1) may represent inter-arrival time values greater than or equal to zero but less than 0.0005 seconds, bin 532(2) may represent inter-arrival time values greater than or equal to 0.0005 seconds but less than 0.0010 seconds, and so on. Alternately, in an embodiment of buffer 508 having the intervals of Table 2, bin 532(1) may represent inter-arrival time values greater than zero but less than or equal to 0.0005 seconds, bin 532(2) may represent inter-arrival time values greater than 0.0005 seconds but less than or equal to 0.0010 seconds, and so on.

TABLE 1

| Buffer 506 Intervals (Bytes) | Buffer 510 Intervals (Bytes) |
|---|---|
| 0 | 0 |
| 64 | 64 |
| 128 | 128 |

TABLE 1-continued

| Buffer 506 Intervals (Bytes) | Buffer 510 Intervals (Bytes) |
|---|---|
| 192 | 192 |
| 256 | 256 |
| 320 | 320 |
| 384 | 384 |
| 448 | 448 |
| 512 | 512 |
| 576 | 576 |
| 640 | 640 |
| 704 | 704 |
| 768 | 768 |
| 832 | 832 |
| 896 | 896 |
| 960 | 960 |
| 1024 | 1024 |
| 1088 | 1088 |
| 1152 | 1152 |
| 1216 | 1216 |
| 1280 | 1280 |
| 1344 | 1344 |
| 1408 | 1408 |
| 1472 | 1472 |
| 1536 | 1536 |
| 1600 | 1600 |
| 1664 | 1664 |
| 1728 | 1728 |
| 1792 | 1792 |
| 1856 | 1856 |
| 2000 | 2000 |
| 2500 | 2500 |
| 3000 | 3000 |
| 3500 | 3500 |
| 4000 | 4000 |
| 5000 | 5000 |
| 6000 | 6000 |

TABLE 2

| Buffer 508 Intervals (Sec) | Buffer 512 Intervals (Sec) |
|---|---|
| 0 | 0 |
| 0.0005 | 0.0005 |
| 0.0010 | 0.0010 |
| 0.0015 | 0.0015 |
| 0.0020 | 0.0020 |
| 0.0025 | 0.0025 |
| 0.0030 | 0.0030 |
| 0.0035 | 0.0035 |
| 0.0040 | 0.0040 |
| 0.0045 | 0.0045 |
| 0.0050 | 0.0050 |
| 0.0055 | 0.0055 |
| 0.0060 | 0.0060 |
| 0.0065 | 0.0065 |
| 0.0070 | 0.0070 |
| 0.0075 | 0.0075 |
| 0.0080 | 0.0080 |
| 0.0085 | 0.0085 |
| 0.0090 | 0.0090 |
| 0.0095 | 0.0095 |
| 0.0100 | 0.0100 |
| 0.0105 | 0.0105 |
| 0.0110 | 0.0110 |
| 0.0115 | 0.0115 |
| 0.0120 | 0.0120 |
| 0.0125 | 0.0125 |
| 0.0130 | 0.0130 |
| 0.0135 | 0.0135 |
| 0.0140 | 0.0140 |
| 0.0145 | 0.0145 |
| 0.0200 | 0.0200 |
| 0.0300 | 0.0300 |
| 0.0500 | 0.0500 |
| 0.1000 | 0.1000 |

TABLE 2-continued

| Buffer 508 Intervals (Sec) | Buffer 512 Intervals (Sec) |
|---|---|
| 0.2000 | 0.2000 |
| 0.3000 | 0.3000 |
| 0.5000 | 0.5000 |
| 1.0000 | 1.0000 |
| 2.0000 | 2.0000 |
| 3.0000 | 3.0000 |
| 5.0000 | 5.0000 |
| 10.0000 | 10.0000 |
| 20.0000 | 20.0000 |

Downlink sliding window processing module 502 is configured to assign each downlink data packet size sample value 516 of a siding window sample of traffic flow 514 to a respective bin 526, according to the value of the sample. For example, assume that buffer 506 has the intervals of Table 1 and that module 502 obtains the following sample values 516 from a sliding window sample of traffic flow 514: (a) 70 bytes, (b) 135 bytes, and (c) 122 bytes. In this example, module 502 would assign sample values (a) and (c) to bin 526(2) because each of these sample values is between 64 bytes and 128 bytes, which corresponds to bin 526(2) in the Table 1 example. However, module 502 would assign sample value (b) to bin 526(3) because this sample value is between 128 bytes and 192 bytes, which corresponds to bin 526(3) in the Table 1 example. Extracting module 500 is further configured to provide a downlink data packet size distribution 550, representing the distribution of sample values 516 among bins 526, i.e., how may sample values 516 are assigned to each bin 526, in the sliding window sample of traffic flow 514. Extracting module 500 is configured to count number of sample values 516 assigned to each bin 526, for example, while assigning samples values 516 to bins 526 or after all sample values 516 have been assigned to bins 526. Extracting module 500 is optionally configured to normalize downlink data packet size distribution 550, so that the distribution sums to one.

Figure 6:
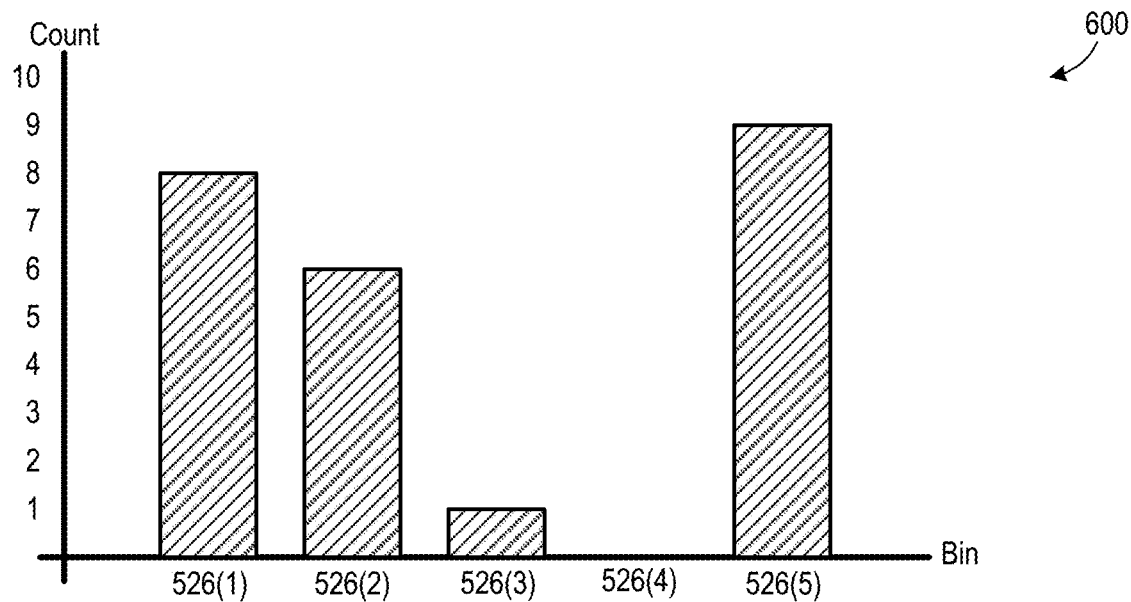
FIG. 6 is a graph illustrating one example of a downlink data packet size distribution generated by the FIG. 5 extracting module.

FIG. 6 is a graph of a downlink data packet size distribution 600, which is one example of downlink data packet size distribution 550 in an embodiment of extracting module 500 where K is equal to five so that buffer 506 includes five bins 526. In this example, eight samples 516 are assigned to bin 526(1), six samples 516 are assigned to bin 526(2), one sample 516 is assigned to bin 526(3), zero samples 516 are assigned to bin 526(4), and nine samples 516 are assigned to 526(5), as illustrated in FIG. 6. Distribution 600 is optionally normalized so that the sample counts of each bin 526 sum to one.

Referring again to FIG. 5, downlink sliding window processing module 502 is further configured to assign each downlink data packet inter-arrival time sample value 518 of a sliding window sample of traffic flow 514 to a respective bin 532, according to the value of the sample, in a manner analogous to how module 502 handles sample values 516. For example, assume that buffer 508 has the intervals of Table 2 and that module 502 obtains the following sample values 518 from a sliding window sample of traffic flow 514: (a) 0.0004 seconds, (b) 0.0008 seconds, and (c) 0.0007 seconds. In this example, module 502 would assign sample value (a) to bin 532(1) because the sample value is between zero and 0.0005 seconds, which corresponds to bin 532(1) in the Table 2 example. However, module 502 would assign sample values (b) and (c) to bin 532(2) because each of these sample values is between 0.0005 seconds and 0.0010 seconds, which corresponds to bin 532(2) in the Table 2 example. Extracting module 500 is further configured to provide a downlink data packet inter-arrival time distribution 552, representing the distribution of sample values 518 among bins 532, i.e., how may sample values 518 are assigned to each bin 532, in the sliding window sample of traffic flow 514. Extracting module 500 is configured to count number of sample values 518 assigned to each bin 532, for example, while assigning samples values 518 to bins 532 or after all sample values 518 have been assigned to bins 532. Extracting module 500 is optionally configured to normalize downlink data packet inter-arrival time distribution 552, e.g., so that the distribution sums to one.

Figure 7:
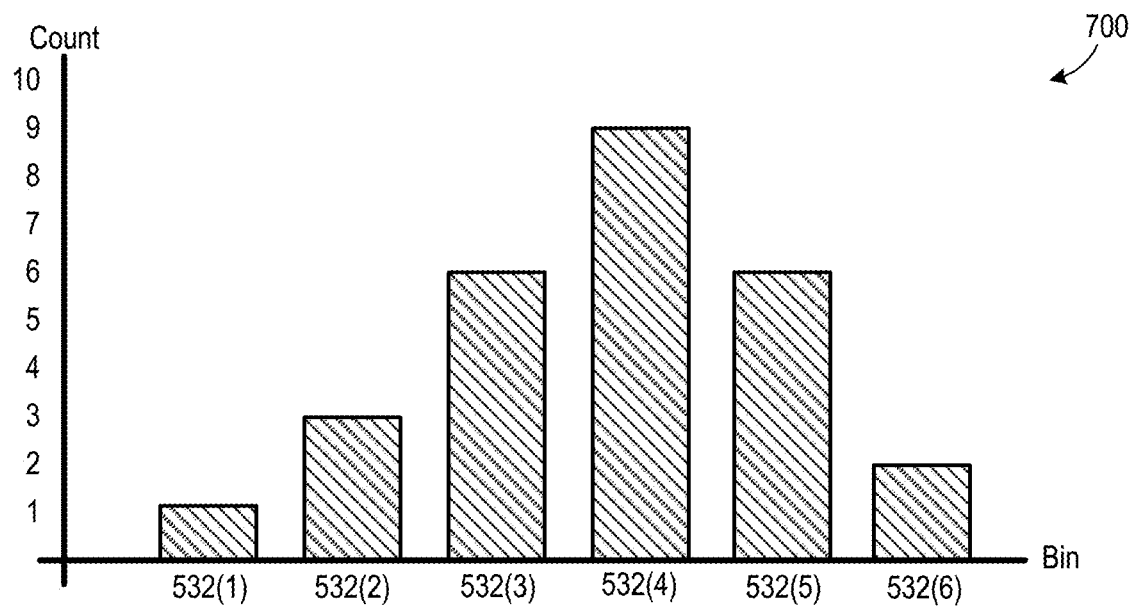
FIG. 7 is a graph illustrating one example of a downlink data packet inter-arrival time distribution generated by the FIG. 5 extracting module.

FIG. 7 is a graph of a downlink data packet inter-arrival time distribution 700, which is one example of downlink data packet inter-arrival time distribution 552 in an embodiment of extracting module 500 where L is equal to six so that buffer 508 includes six bins 532. In this example, one sample 518 is assigned to bin 532(1), three samples 518 are assigned to bin 532(2), six samples 518 are assigned to bin 532(3), nine samples 518 are assigned to bin 532(4), six samples 518 are assigned to bin 532(5), and two samples 518 are assigned to bin 532(6), as illustrated in FIG. 7. Distribution 700 is optionally normalized so that the sample counts of each bin 532 sum to one.

Referring again to FIG. 5, uplink sliding window processing module 504 is configured to assign samples 522 and 524 of a sliding window sample of traffic flow 520 to bins 538 and 544, respectively, in a manner analogous to how downlink sliding window processing module 502 is configured to respectively assign samples 516 and 518 to bins 526 and 532. Additionally, extracting module 500 is configured to provide an uplink data packet size distribution 554, representing the distribution of sample values 522 among bins 538, i.e., how may sample values 522 are assigned to each bin 538, in a sliding window sample of traffic flow 520. Accordingly, uplink data packet size distribution 554 is analogous to downlink data packet size distribution 550, but for uplink data packets instead of for downlink data packets. Extracting module 500 is configured to count number of sample values 522 assigned to each bin 538, for example, while assigning samples values 522 to bins 538 or after all sample values 522 have been assigned to bins 538. Furthermore, extracting module 500 is configured to provide an uplink data packet inter-arrival time distribution 556, representing the distribution of sample values 524 among bins 544, i.e., how may sample values 524 are assigned to each bin 544, of a sliding window sample of traffic flow 520. Accordingly, uplink data packet inter-arrival time distribution 556 is analogous to downlink data packet inter-arrival time distribution 552, but for uplink data packets instead of for downlink data packets. Extracting module 500 is configured to count number of sample values 524 assigned to each bin 544, for example, while assigning samples values 524 to bins 544 or after all sample values 524 have been assigned to bins 544.

Distributions 550, 552, 554, and 556 collectively form an embodiment of features 112 of FIG. 1, and distributions 550, 552, 554, and 556 are accordingly provided as inputs to machine learning module 106. In some embodiments, machine learning module 106 includes a convolutional neural network, and each of distributions 550, 552, 554, and 556 is a respective input channel of the convolutional neural network.

The configuration of extracting module 500 advantageously promotes low complexity and low processing requirements. For example, assigning samples values 516, 518, 522, and 524 to respective bins may be significantly computationally simpler than calculating statistical values of a traffic flow. As another example, in certain embodiments, bins 526, 532, 538, and 544 hold only sample count values, so that the bins need not have large data storage capacity. For instance, in a particular embodiment, each bin 526, 532, 538, and 544 has only a one-byte data storage capacity that is sufficient for counting samples assigned to the bin.

Extracting module 500 could be modified to provide a different number of data packet distributions and/or one or more alternative data packet distributions. For example, in an alternate embodiment of extracting module 500, uplink sliding window processing module 504, buffer 510, and buffer 512 are omitted so that extracting module 500 provides only distributions 550 and 552. As another example, in another alternate embodiment of extracting module 500, buffers 508 and 512 are omitted so that extracting module 500 provides only distributions 552 and 556. As another example, another alternate embodiment of extracting module 500 includes an additional buffer for determining a distribution of an additional class of sample values.

FIG. 8 is a block diagram of a machine learning module 800, which is one possible embodiment of machine learning module 106 of FIG. 1 that is configured as a neural network. Machine learning module 800 is implemented, for example, by processor 302 executing machine learning instructions 310 (FIG. 3). Machine learning module 800 includes a fully connected input layer 802, N hidden modules 804, a fully connected output layer 806, and an activation function 808, where N is an integer greater than or equal to one. Fully connected input layer 802, hidden modules 804, and fully connected output layer 806 are collectively configured to process features 112 from extracting module 104 using neural network techniques, to generate output data 810. Activation function 808 is configured to generate classification data 114 from output data 810. In some embodiment, activation function 808 is a logarithmic Softmax function, such that classification data 114 is normalized, i.e., it sums to one.

FIG. 9 is a block diagram of a hidden module 900, which is one possible embodiment of a hidden module 804 of FIG. 8. Hidden module 900 includes a fully connected layer 902, an activation layer 904, an optional batch normalization layer 906, and an optional dropout layer 908. In some embodiments, activation layer 904 is a Rectified Linear Unit (ReLU) activation layer, such as to help compensate for any linearity that might be imposed by operation of machine learning module 800. Optional batch normalization layer 906 may help increase training speed, and optional dropout layer 908, which is used during training, helps prevent overfitting of training data.

Example Applications

Figure 10:
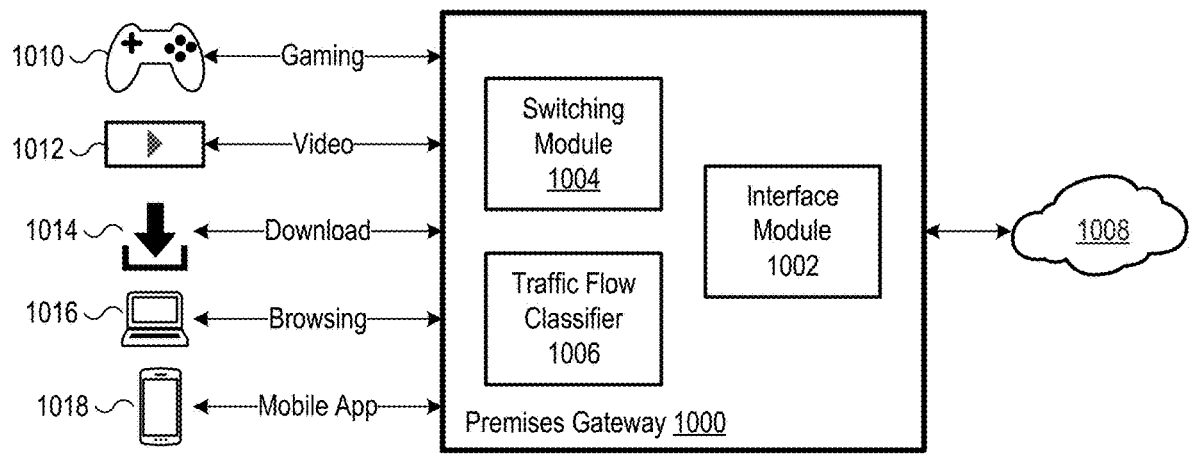
FIG. 10 is a block diagram of a premises gateway including a traffic flow classifier, according to an embodiment.
Figure 11:
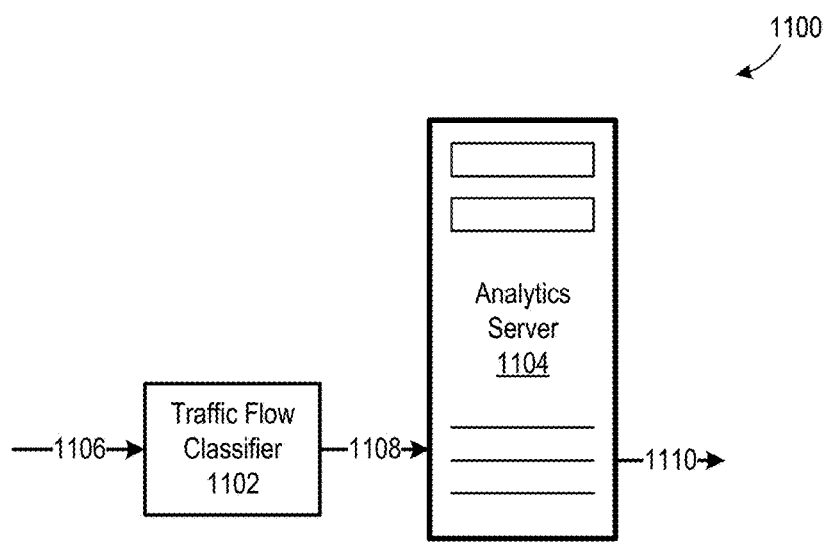
FIG. 11 is a block diagram of an analytics system including a traffic flow classifier, according to an embodiment.
Figure 12:
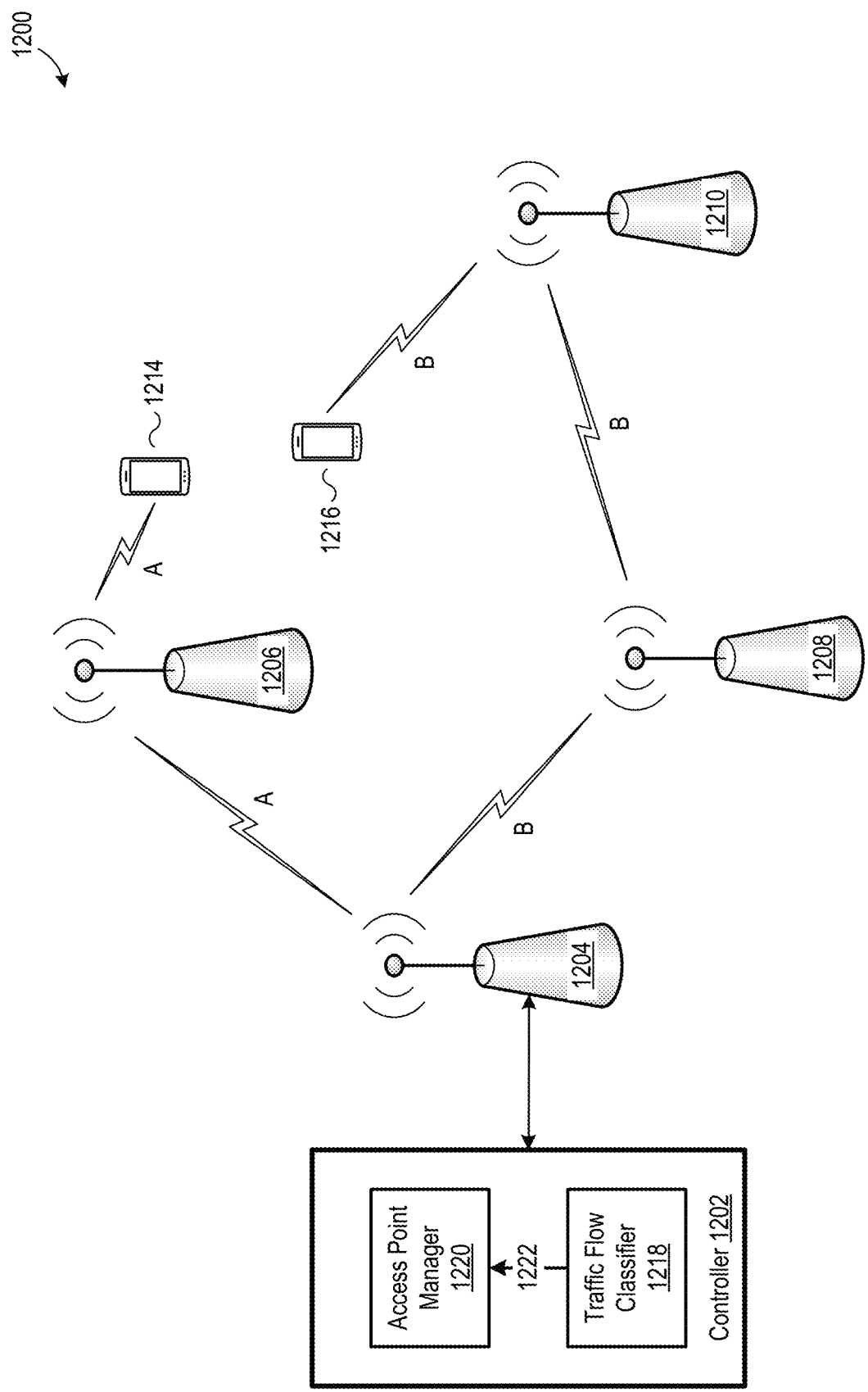
FIG. 12 is a block diagram of a wireless communication system including a traffic flow classifier, according to an embodiment.

Discussed below with respect to FIGS. 10-12 are several example applications of traffic flow classifier 100. It is understood, though, that traffic flow classifier 100 is not limited to these example applications.

FIG. 10 is a block diagram of a premises gateway 1000 including an interface module 1002, a switching module 1004, and a traffic flow classifier 1006. Premises gateway 1000 is used, for example, to interface one or more clients at a home or business with an access network 1008. Examples of access network 1008 include, but are not limited to, a cable access network, an optical access network (including but not limited to an Ethernet passive optical network (EPON), a radio frequency of over glass (RFOG or RFoG) network, a Gigabit-capable passive optical network (GPON)), a digital subscriber line (DSL) network, and a wireless network, including but limited to a cellular wireless network (e.g., a long-term evolution (LTE) wireless network, a fifth generation (5G) wireless network, a sixth generation (6G) wireless network), a Wi-Fi wireless network, and a satellite wireless network). Interface module 1002 is configured to interface premises gateway 1000 with access communication network 1008. In some embodiments, interface module 1002 includes a modem (e.g., a cable modem, DSL modem, or wireless modem), an optical line termination (ONT) or optical line unit (ONU), and/or a wireless transceiver. Premises gateway 1000 could be modified so that interface module 1002 is external to the premises gateway.

Switching module 1004 is configured to route data between interface module 1002 and clients of premises gateway 1000. Premises gateway 1000 is illustrated as supporting a gaming client 1010, a video client 1012, a download client 1014, a web browsing client 1016, and a mobile application (app) client 1018, although the type and number of clients supported by premises gateway 1000 may vary. Clients 1010-1018 are communicatively coupled to premises gateway 1000, for example, via a wireless communication link, an electrical cable, or an optical cable. Some embodiments of switching module 1004 are further configured to perform network address translation (NAT) and/or to serve as a security gateway.

Traffic flow classifier 1006 is an embodiment of traffic flow classifier 100 of FIG. 1, and traffic flow classifier 1006 is configuring to classify traffic flows handled by premises gateway 1000. For example, some embodiments of traffic flow classifier 1006 are configured to classify the gaming traffic flow, the video traffic flow, the download traffic flow, the browsing traffic flow, and the mobile application traffic flow, illustrated in FIG. 10. Premises gateway 1000 is configured, for example, to use traffic classification data from traffic flow classifier to provide QoS. For example, premises gateway 1000 may provide priority handling of the gaming traffic flow and the video traffic flow because these two traffic flows are particularly sensitive to latency. Alternately or additionally, traffic classification data from traffic flow classifier 1006 may be used to troubleshoot or optimize premises gateway 1000 and/or a network including premises gateway 1000.

FIG. 11 is a block diagram of an analytics system 1100 including a traffic flow classifier 1102 and an analytics server 1104. Analytics system 1100 could be deployed, for example, in a business or at a network node (e.g., a cable headend, a central office, an optical line terminal (OLT), a digital subscriber line access multiplexer (DSLAM), a network hub, a network core, a satellite ground station, a satellite wireless relay device, a wireless base station, a network router, a network switch, a network storage device, a content server, an access device, a network control center, etc.) to provide insight into a communication network, such as for optimizing the network, troubleshooting the network, reconfiguring the network, and/or expanding the network. Traffic flow classifier 1102 is an embodiment of traffic flow classifier 100 of FIG. 1, and traffic flow classifier 1102 is configured to receive communication network traffic 1106 and output classification data 1108 identifying a type of one or more traffic flows of communication network traffic 1106. Accordingly, classification data 1108 is an embodiment of classification data 114 of FIG. 1. Analytics server 1104 is configured to generate communication network analytics data 1110 at least partially from classification data 1108.

Analytics server 1104 optional receives additional data (not shown) for use in generating communication network analytics data 1110.

FIG. 12 is a block diagram of a wireless communication system 1200 including a controller 1202 and wireless access points 1204, 1206, 1208, and 1210. FIG. 12 also depicts wireless clients 1214 and 1216 being served by system 1200, although wireless clients 1214 and 1216 are not necessarily part of system 1200. Furthermore, the number and type of wireless clients served by system 1200 may vary.

In some embodiments, wireless access points 1204, 1206, 1208, and 1210 are Wi-Fi wireless access points, LTE wireless access points, 5G wireless access points, and/or 6G wireless access points. FIG. 5 illustrates (1) wireless access point 1204 being a primary wireless access point that is directly communicatively coupled to controller 1202, and (2) wireless access points 1206, 1208, and 1210 being secondary wireless access points that communicate with controller 1202 via primary wireless access point 1204, such that system 1200 has a mesh configuration. However, system 1200 could be modified so that one or more of wireless access points 1206, 1208, and 1210 are directly communicatively coupled to controller 1202. Additionally, the number of wireless access points in system 1200 may vary without departing from the scope hereof.

Controller 1202 includes a traffic flow classifier 1218 and an access point manager 1220. Traffic flow classifier 1218 is an embodiment of traffic flow classifier 100 of FIG. 1, and traffic flow classifier 1218 is configured to generate classification data 1222 classifying traffic flows in system 1200. Accordingly, classification data 1222 is an embodiment of classification data 114 of FIG. 1. Access point manager 1220 is configured to manage wireless access points 1204, 1206, 1208, and 1210 at least partially based on classification data 1222. For example, in some embodiments, access point manager 1220 is configured to determine from classification data 1222 how system 1200 is being used, and access point manager 1220 is configured to manage wireless access points 1204, 1206, 1208, and 1210 to optimize system 1200 for the manner in which it is being used, such that system 1200 automatically adapts to its use. For instance, access point manager 1220 may be configured to allocate capacity among wireless access points 1204, 1206, 1208, and 1210 in a manner which best support current, historical, and/or predicted use of system 1200.

As another example, some embodiments of access point manager 1220 are configured to route data via wireless access points 1204, 1206, 1208, and 1210 at least partially based on classification data 1222. For instance, assume that classification data 1222 indicates that wireless client 1214 is engaged in video conferencing and that wireless client 1216 is engaged in web browsing. As depicted in FIG. 12, both of wireless clients 1214 and 1216 are within range of wireless access point 1206. However, access point manager 1220 may route data to wireless clients 1214 and 1216 via different respective paths A and B based on classification data 1222, to promote efficient use of system 1200. Specifically, video conferencing data flows associated with wireless client 1214 require low latency, and access point manager 1220 may therefore route data between wireless access point 1204 and wireless client 1214 via relatively short path A, to minimize latency. On the other hand, web browsing data flows associated with wireless client 1216 do not require low latency, and access point manager 1220 may therefore route data between wireless access point 1204 and wireless client 1216 via relatively long path B, to reserve capacity of path A for traffic flows requiring low latency.

Experimental Results

Discussed below are experimental results from several embodiments of traffic flow classifier 100. It is understood, though, that traffic flow classifier 100 is not limited to the configurations discussed below.

Experimental Configuration A

An embodiment of traffic flow classifier 100 including an embodiment of extracting module 400 was tested. A Stochastic Gradient Descent (SGD) method was used in training, and the following hyperparameters were used: (1) mini-batch size: 64, (2) number of SGD burn-in mini-batches: 1e4, (3) learning rate: 1e-4, (4), momentum: 0.9, and (5) weight decay: 5e-4. Table 3 below shows classification results for a configuration with four flow classes (gaming, uplink video, downlink video, and web browsing) where both downlink and uplink traffic features were used for classification. Overall precision was 0.94244, overall recall was 0.90199, and overall accuracy was 0.9523 with the Table 3 configuration. Additionally, performance was 6270.343 samples per second with the Table 3 configuration.

TABLE 3

| Class | Precision | Recall | Accuracy |
| --- | --- | --- | --- |
| Gaming | 1.0 | 0.993 | 0.998 |
| Uplink video | 1.0 | 1.0 | 1.0 |
| Downlink video | 0.846 | 0.98 | 0.952 |
| Web browsing | 0.924 | 0.634 | 0.859 |

Table 4 below shows classification results for a configuration with five flow classes (gaming, uplink video, downlink video, web browsing, and video conferencing) where both downlink and uplink traffic features were used for classification. Overall precision was 0.94692, overall recall was 0.9146, and overall accuracy was 0.9646 with the Table 4 configuration. Additionally, performance was 6386.328 samples per second with the Table 4 configuration.

TABLE 4

| Class | Precision | Recall | Accuracy |
| --- | --- | --- | --- |
| Gaming | 0.999 | 0.991 | 0.998 |
| Uplink video | 1.0 | 1.0 | 1.0 |
| Downlink video | 0.828 | 0.978 | 0.956 |
| Web browsing | 0.907 | 0.605 | 0.869 |
| Video conferencing | 1.0 | 0.999 | 1.0 |

Table 5 below shows classification results for a configuration with five flow classes (gaming, uplink video, downlink video, web browsing, and video conferencing) where only uplink traffic features were used for classification. Overall precision was 0.89017, overall recall was 0.87124, and overall accuracy was 0.9272 with the Table 5 configuration. Additionally, performance was 6094.151 samples per second with the Table 5 configuration.

TABLE 5

| Class | Precision | Recall | Accuracy |
| --- | --- | --- | --- |
| Gaming | 0.999 | 0.883 | 0.974 |
| Uplink video | 1.0 | 1.0 | 1.0 |
| Downlink video | 0.53 | 0.988 | 0.848 |
| Web browsing | 0.937 | 0.487 | 0.817 |

TABLE 5-continued

| Class | Precision | Recall | Accuracy |
| --- | --- | --- | --- |
| Video conferencing | 0.985 | 0.998 | 0.997 |

Table 6 below shows classification results for a configuration with five flow classes (gaming, uplink video, downlink video, web browsing, and video conferencing) where only downlink traffic features were used for classification. Overall precision was 0.94946, overall recall was 0.890777, and overall accuracy was 0.9558 with the Table 6 configuration. Additionally, performance was 5584.564 samples per second with the Table 6 configuration.

TABLE 6

| Class | Precision | Recall | Accuracy |
| --- | --- | --- | --- |
| Gaming | 0.997 | 0.938 | 0.986 |
| Uplink video | 0.954 | 1.0 | 0.99 |
| Downlink video | 0.859 | 0.99 | 0.966 |
| Web browsing | 0.953 | 0.528 | 0.841 |
| Video conferencing | 0.985 | 0.997 | 0.996 |

Configuration B

An embodiment of traffic flow classifier 100 including an embodiment of extracting module 500 was tested. The bin intervals of Tables 1 and 2 above were used. Machine learning module 106 was configured as a neural network via the following instructions:

FlowNet(
  (flow net): Sequential(
    (0):    Linear(in_features=156,    out_features=16, bias=True)
    (1): ReLU( )
    (2):    Linear(in_features=16,    out_features=16, bias=True)
    (3): ReLU( )
    (4):    Linear(in_features=16,    out_features=16, bias=True)
    (5): ReLU( )
    (6): Dropout(p=0.1, inplace=False)
  (7): Linear(in_features=16, out_features=5, bias=True)
  (8): Softmax( )
)
)

Table 7 below shows classification results for a configuration with five flow classes (gaming, uplink video, downlink video, web browsing, and video conferencing) where both downlink and uplink traffic features were used for classification. Performance was better than performance of configuration A above.

TABLE 7

| Class | Precision | Recall | Accuracy |
| --- | --- | --- | --- |
| Gaming | 1.0 | 0.998482 | 0.999696 |
| Uplink video | 0.999893 | 1.0 | 0.999979 |
| Downlink video | 1.0 | 1.0 | 1.0 |
| Web browsing | 0.973971 | 1.0 | 0.994684 |
| Video conferencing | 1.0 | 0.999848 | 0.99997 |

Configuration C

Another embodiment of traffic flow classifier 100 including an embodiment of extracting module 500 was tested.

The bin intervals of Tables 1 and 2 above were used. Machine learning module 106 was configured as a neural network via the following instructions:

FlowNet(
  (conv1): Sequential(
    (0): Conv1d(1, 4, kernel_size=(3,), stride=(1,), padding=(1,), bias=False)
    (1): BatchNorm1d(4, eps=1e-05, momentum=0.1, affine=True, track_running_stats=True)
    (2): LeakyReLU(negative_slope=0.01)
    (3): Conv1d(4, 4, kernel_size=(3,), stride=(1,), padding=(1,), bias=False)
    (4): BatchNorm1d(4, eps=1e-05, momentum=0.1, affine=True, track_running_stats=True)
    (5): LeakyReLU(negative_slope=0.01)
    (6): Flatten( )
  )
  (conv2): Sequential(
    (0): Conv1d(1, 4, kernel_size=(3,), stride=(1,), padding=(1,), bias=False)
    (1): BatchNorm1d(4, eps=1e-05, momentum=0.1, affine=True, track_running_stats=True)
    (2): LeakyReLU(negative_slope=0.01)
    (3): Conv1d(4, 4, kernel_size=(3,), stride=(1,), padding=(1,), bias=False)
    (4): BatchNorm1d(4, eps=1e-05, momentum=0.1, affine=True, track_running_stats=True)
    (5): LeakyReLU(negative_slope=0.01)
    (6): Flatten( )
  )
  (conv3): Sequential(
    (0): Conv1d(1, 4, kernel_size=(3,), stride=(1,), padding=(1,), bias=False)
    (1): BatchNorm1d(4, eps=1e-05, momentum=0.1, affine=True, track_running_stats=True)
    (2): LeakyReLU(negative_slope=0.01)
    (3): Conv1d(4, 4, kernel_size=(3,), stride=(1,), padding=(1,), bias=False)
    (4): BatchNorm1d(4, eps=1e-05, momentum=0.1, affine=True, track_running_stats=True)
    (5): LeakyReLU(negative_slope=0.01)
    (6): Flatten( )
  )
  (conv4): Sequential(
    (0): Conv1d(1, 4, kernel_size=(3,), stride=(1,), padding=(1,), bias=False)
    (1): BatchNorm1d(4, eps=1e-05, momentum=0.1, affine=True, track_running_stats=True)
    (2): LeakyReLU(negative_slope=0.01)
    (3): Conv1d(4, 4, kernel_size=(3,), stride=(1,), padding=(1,), bias=False)
    (4): BatchNorm1d(4, eps=1e-05, momentum=0.1, affine=True, track_running_stats=True)
    (5): LeakyReLU(negative_slope=0.01)
    (6): Flatten( )
  )
  (flow net): Sequential(
    (0): Linear(in_features=624, out_features=16, bias=True)
    (1): ReLU( )
    (2): Linear(in_features=16, out_features=16, bias=True)
    (3): ReLU( )
    (4): Dropout(p=0.1, inplace=False)
    (5): Linear(in_features=16, out_features=5, bias=True)
    (6): Softmax( )
  )
)

Inference speed was significantly slower with configuration C than configurations A and B, but configuration C provided better accuracy than configurations A and B. Configuration C is also amenable to complex traffic behaviors and additional traffic flow classes. The four convolutional models of configuration C handle feature extraction from values distributions in the bins. Conv1 and conv2 handle both downlink and uplink inter-arrival time features, and conv3 and conv4 handle packet size features. The outputs from convolutional layers are flattened and concatenated, and they become an array of 624 values as the input of the fully connected classifier.

Configuration D

Another embodiment of traffic flow classifier 100 including an embodiment of extracting module 500 was tested. The bin intervals of Tables 1 and 2 above were used. Machine learning module 106 was configured as a neural network via the following instructions:

FlowNet(
  (conv1): Sequential(
    (0): Conv1d(4, 4, kernel_size=(3,), stride=(1,), padding=(1,), bias=False)
    (1): BatchNorm1d(4, eps=1e-05, momentum=0.1, affine=True, track_running_stats=True)
    (2): LeakyReLU(negative_slope=0.01)
  )
  (conv2): Sequential(
    (0): Conv1d(4, 4, kernel_size=(3,), stride=(2,), padding=(1,), bias=False)
    (1): BatchNorm1d(4, eps=1e-05, momentum=0.1, affine=True, track_running_stats=True)
    (2): LeakyReLU(negative_slope=0.01)
  )
  (conv3): Sequential(
    (0): Conv1d(4, 8, kernel_size=(3,), stride=(1,), padding=(1,), bias=False)
    (1): BatchNorm1d(8, eps=1e-05, momentum=0.1, affine=True, track_running_stats=True)
    (2): LeakyReLU(negative_slope=0.01)
  )
  (conv4): Sequential(
    (0): Conv1d(8, 4, kernel_size=(3,), stride=(1,), padding=(1,), bias=False)
    (1): BatchNorm1d(4, eps=1e-05, momentum=0.1, affine=True, track_running_stats=True)
    (2): LeakyReLU(negative_slope=0.01)
  )
  (conv5): Sequential(
    (0): Conv1d(4, 4, kernel_size=(3,), stride=(2,), padding=(1,), bias=False)
    (1): BatchNorm1d(4, eps=1 e-05, momentum=0.1, affine=True, track_running_stats=True)
    (2): LeakyReLU(negative_slope=0.01)
    (3): Flatten( )
    (4): Linear(in_features=76, out_features=3, bias=True)
    (5): Softmax(dim=None)
  )
)

Configuration D uses a small neural network, and the configuration achieves both high performance and high speed. Accordingly, configuration D is well-suited for embedded device applications, such as in wireless access points.

Configuration E

Another embodiment of traffic flow classifier 100 including an embodiment extracting module 500 of was tested. Packet size distributions and inter-arrival time distributions from extracting module 500 were processed by taking their square root, before providing them to machine learning module 106. Additionally, logarithmic bin widths were determined using the following procedure: (a) define minimum packet size values 528 and 540 as 50 bytes, (b) define maximum packet size values 530 and 542 as 1600 bytes, (c) define minimum inter-arrival time values 534 and 546 as 0.00001 seconds, (d) define maximum inter-arrival time values 536 and 548 as 10 seconds, (e) define the size of the input feature for each distribution, e.g., define each input feature size as 96 so that the total feature size is 96*4=384, (f) calculate logarithmic bins, e.g., if each input feature size is 96, there are 96 bins and 97 bin edges for each buffer, and the logarithmic bins may be evenly spaced on a log 10 scale, such as using numpy's logspace function.

Machine learning module 106 was configured as a neural network via the following instructions in configuration E:

```
FlowNet(
  (conv1): Sequential(
    (0): Conv1d(4, 8, kernel_size=(3,), stride=(1,), padding=(1,), bias=False)
    (1): BatchNorm1d(8, eps=1e-05, momentum=0.1, affine=True, track_running_stats=True)
    (2): LeakyReLU(negative_slope=0.01)
  )
  (conv2): Sequential(
    (0): Conv1d(8, 8, kernel_size=(3,), stride=(2,), padding=(1,), bias=False)
    (1): BatchNorm1d(8, eps=1e-05, momentum=0.1, affine=True, track_running_stats=True)
    (2): LeakyReLU(negative_slope=0.01)
  )
  (conv3): Sequential(
    (0): Conv1d(8, 16, kernel_size=(3,), stride=(1,), padding=(1,), bias=False)
    (1): BatchNorm1d(16, eps=1e-05, momentum=0.1, affine=True, track_running_stats=True)
    (2): LeakyReLU(negative_slope=0.01)
  )
  (conv4): Sequential(
    (0): Conv1d(16, 8, kernel_size=(3,), stride=(1,), padding=(1,), bias=False)
    (1): BatchNorm1d(8, eps=1e-05, momentum=0.1, affine=True, track_running_stats=True)
    (2): LeakyReLU(negative_slope=0.01)
  )
  (conv_additional_2): Sequential(
    (0): Conv1d(8, 8, kernel_size=(3,), stride=(1,), padding=(1,), bias=False)
    (1): BatchNorm1d(8, eps=1e-05, momentum=0.1, affine=True, track_running_stats=True)
    (2): LeakyReLU(negative_slope=0.01)
  )
  (conv_additional_3): Sequential(
    (0): Conv1d(8, 8, kernel_size=(3,), stride=(1,), padding=(1,), bias=False)
    (1): BatchNorm1d(8, eps=1e-05, momentum=0.1, affine=True, track_running_stats=True)
    (2): LeakyReLU(negative_slope=0.01)
  )
  (conv5): Sequential(
    (0): Conv1d(8, 8, kernel_size=(3,), stride=(2,), padding=(1,), bias=False)
    (1): BatchNorm1d(8, eps=1e-05, momentum=0.1, affine=True, track_running_stats=True)
    (2): LeakyReLU(negative_slope=0.01)
    (3): Flatten()
    (4): Linear(in_features=192, out_features=6, bias=True)
    (5): Softmax(dim=1)
  )
)
```

The neural network configured by the instructions immediately above implements feature aggregation where features are passed through convolutional layers in the following order, where x represents the features, and aggre_features represents saved features for aggregation: (1) x=conv1(x), (2) aggre_features=conv2(x), (3) x=conv3(features), (4) x=conv4(x), (5) x=conv_additional_2(x), (6) x=conv_additional_3(x), (7) traffic_label=conv5(x+aggre_features)—this is where feature aggregation happens—the feature output from a previous convolutional layer is being aggregated with the feature output from a deeper layer before going into the last layer, and (8) traffic_label is the final output of the neural network.

Machine learning module 106 could alternately be configured as a neural network via the following instructions to create a smaller and faster machine learning model, with only small sacrifices to precision, recall, and accuracy:

```
FlowNet(
  (flow net): Sequential(
    (0): Conv1d(4, 8, kernel_size=(3,), stride=(1,), padding=(1,), bias=False)
    (1): BatchNorm1d(8, eps=1e-05, momentum=0.1, affine=True, track_running_stats=True)
    (2): LeakyReLU(negative_slope=0.01)
    (3): Conv1d(8, 8, kernel_size=(3,), stride=(2,), padding=(1,), bias=False)
    (4): BatchNorm1d(8, eps=1e-05, momentum=0.1, affine=True, track_running_stats=True))
    (5): LeakyReLU(negative_slope=0.01)
    (6): Conv1d(8, 16, kernel_size=(3,), stride=(1,), padding=(1,), bias=False)
    (7): BatchNorm1d(16, eps=1e-05, momentum=0.1, affine=True, track_running_stats=True)
    (8): LeakyReLU(negative_slope=0.01)
    (9): Conv1d(16, 8, kernel_size=(3,), stride=(1,), padding=(1,), bias=False)
    (10): BatchNorm1d(8, eps=1e-05, momentum=0.1, affine=True, track_running_stats=True)
    (11): LeakyReLU(negative_slope=0.01)
    (12): Conv1d(8, 8, kernel_size=(3,), stride=(2,), padding=(1,), bias=False)
    (13): BatchNorm1d(8, eps=1e-05, momentum=0.1, affine=True, track_running_stats=True)
    (14): LeakyReLU(negative_slope=0.01)
    (15): Flatten()
    (16): Linear(in_features=192, out_features=6, bias=True)
    (17): Softmax(dim=1)
  )
)
```

Combinations of Features

Features described above may be combined in various ways without departing from the scope hereof. The following examples illustrate some possible combinations.

(A1) A method for traffic flow classification in a communication network includes (1) identifying a traffic flow in communication network traffic, (2) extracting features of the traffic flow, and (3) using a machine learning model, classifying the traffic flow at least partially based on the features of the traffic flow.

(A2) In the method denoted as (A1), extracting the features of the traffic flow may include (1) obtaining a plurality of sample values from the traffic flow and (2) assigning each sample value to a respective bin of a plurality of bins according to the sample value.

(A3) The method denoted as (A2) may further include counting a number of sample values assigned to each bin.

(A4) In the method denoted as (A3), the features of the traffic flow may include the number of sample values assigned to each bin.

(A5) Any one of the methods denoted as (A3) and (A4) may further include normalizing the number of sample values assigned to each bin.

(A6) In any one of the methods denoted as (A2) through (A5), the plurality of bins may have respective widths that span a starting value and an ending value.

(A7) In the method denoted as (A6), the plurality of bins may have respective widths that logarithmically span the starting value and the ending value.

(A8) In the method denoted as (A1), the features of the traffic flow may include (1) a distribution of packet size values of a sliding window sample of the traffic flow and (2) a distribution of inter-arrival time values of a sliding window sample of the traffic flow.

(A9) In the method denoted as (A8), the machine learning model may be a convolutional neural network, and each of the distribution of packet size values and the distribution of inter-arrival time values may be a respective input channel of the convolution neural network.

(A10) In the method denoted as (A1), extracting one or more features of the traffic flow may include determining statistical values of a sliding window sample of the traffic flow.

(A11) In the method denoted as (A10), the statistical values may include at least one of (1) standard deviation of data packet size, (2) average of data packet size, (3) standard deviation of data packet inter-arrival time, and (4) average of data packet inter-arrival time.

(A12) The method denoted as (A11) may further include normalizing each of the standard deviation of data packet size, the average of data packet size, the standard deviation of data packet inter-arrival time, and the average of data packet inter-arrival time, to yield the features of the traffic flow.

(A13) Any one of the methods denoted as (A1) through (A12) may further include controlling a wireless communication network at least partially according to a classification of the traffic flow from the machine learning model.

(A14) In any one of the methods denoted as (A1) through (A13), identifying the traffic flow in communication network traffic may include identifying the traffic flow according to one or more of (1) data packet source address, (2) data packet destination address, (3) data packet source port, (4) data packet destination port, and (5) data packet protocol.

(A15) Any one of the methods denoted as (A1) through (A14) may further include training the machine learning model using a real communication network traffic flow.

(B1) A method for traffic flow classification in a communication network may include (1) identifying a traffic flow in communication network traffic, (2) obtaining packet size values of a sliding window sample of the traffic flow, (3) obtaining inter-arrival time values of a sliding window sample of the traffic flow, (4) assigning each packet size value to a respective packet size bin of a plurality of packet size bins, according to the packet size value, (5) assigning each inter-arrival time value to a respective inter-arrival time bin of a plurality of inter-arrival time bins, according to the inter-arrival time value, (6) counting the number of packet size values assigned to each packet size bin to determine a distribution of packet size values, (7) counting the number of inter-arrival times values assigned to each inter-arrival time bin to determine a distribution of inter-arrival time values, and (8) using a machine learning model, classifying the traffic flow at least partially based on the distribution of packet size values and the distribution of inter-arrival time values.

(B2) In the method denoted as (B1), the machine learning model may include a convolutional neural network, the distribution of packet size values may be a first input channel to the convolutional neural network, and the distribution of inter-arrival time values may be a second input channel to the convolutional neural network.

(B3) In any one of the methods denoted as (B1) and (B2), the plurality of packet size bins may have respective widths that logarithmically span a first starting value and a first ending value, and the plurality of inter-arrival time bins may have respective widths that logarithmically span a second starting value and a second ending value.

(C1) A traffic flow classifier may include (1) a preprocessing module configured to identify a traffic flow in communication network traffic, (2) an extracting module configured to extract features of the traffic flow, and (3) a machine learning module configured to classify the traffic flow at least partially based on the features of the traffic flow.

(C2) In the traffic flow classifier denoted as (C1), the extracting module may be configured to determine (1) a distribution of packet size values of a sliding window sample of the traffic flow and (2) a distribution of inter-arrival time values of a sliding window sample of the traffic flow.

(C3) In the traffic flow classifier denoted as (C2), the machine learning module may include a convolutional neural network configured to use at least the distribution of packet size values and distribution of inter-arrival time values as respective input channels.

(C4) In the traffic flow classifier denoted as (C1), the extracting module may be configured to determine at least one of (1) standard deviation of data packet size, (2) average of data packet size, (3) standard deviation of data packet inter-arrival time, and (4) average of data packet inter-arrival time.

(C5) In any one of the traffic flow classifiers denoted as (C1) through (C4), each of the preprocessing module, the extracting module, and the machine learning module may be at least partially implemented by one or more processors executing respective instructions stored in one or more memories.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for traffic flow classification in a communication network, comprising;
    identifying a traffic flow in communication network traffic;
    obtaining packet size values of a sliding window sample of the traffic flow;
    obtaining inter-arrival time values of a sliding window sample of the traffic flow;
    assigning each packet size value to a respective packet size bin of a plurality of packet size bins, according to the packet size value;
    assigning each inter-arrival time value to a respective inter-arrival time bin of a plurality of inter-arrival time bins, according to the inter-arrival time value;
    counting the number of packet size values assigned to each packet size bin to determine a distribution of packet size values;
    counting the number of inter-arrival times values assigned to each inter-arrival time bin to determine a distribution of inter-arrival time values; and
    using a machine learning model, classifying the traffic flow at least partially based on the distribution of packet size values and the distribution of inter-arrival time values.

2. The method of claim 1, wherein
    the plurality of packet size bins have respective widths that span a starting value and an ending value; and
    the plurality of inter-arrival time bins have respective widths that span a starting value and an ending value.

3. The method of claim 1, wherein:
    the distribution of packet size values is based on a sliding window sample of the traffic flow; and
    the distribution of inter-arrival time values of is based on a sliding window sample of the traffic flow.

4. The method of claim 1, further comprising controlling a wireless communication network at least partially according to a classification of the traffic flow from the machine learning model.

5. The method of claim 1, wherein identifying the traffic flow in communication network traffic comprises identifying the traffic flow according to one or more of:
    data packet source address;
    data packet destination address;
    data packet source port;
    data packet destination port; and
    data packet protocol.

6. The method of claim 1, further comprising training the machine learning model using a real communication network traffic flow.

7. The method of claim 1, further comprising:
    normalizing the number of sample values assigned to each packet size bin; and
    normalizing the number of sample values assigned to each inter-arrival time bin.

8. The method of claim 1, wherein:
    the machine learning model comprises a convolutional neural network;
    the distribution of packet size values is a first input channel to the convolutional neural network; and
    the distribution of inter-arrival time values is a second input channel to the convolutional neural network.

9. The method of claim 1, wherein:
    the plurality of packet size bins have respective widths that logarithmically span a first starting value and a first ending value; and
    the plurality of inter-arrival time bins have respective widths that logarithmically span a second starting value and a second ending value.

10. A traffic flow classifier, comprising:
    a preprocessing module configured to identify a traffic flow in communication network traffic;
    an extracting module configured to:
        obtain packet size values of a sliding window sample of the traffic flow,
        obtain inter-arrival time values of a sliding window sample of the traffic flow,
        assign each packet size value to a respective packet size bin of a plurality of packet size bins, according to the packet size value,
        assign each inter-arrival time value to a respective inter-arrival time bin of a plurality of inter-arrival time bins, according to the inter-arrival time value,
        count the number of packet size values assigned to each packet size bin to determine a distribution of packet size values, and
        count the number of inter-arrival times values assigned to each inter-arrival time bin to determine a distribution of inter-arrival time values; and
    a machine learning module configured to classify the traffic flow at least partially based on the distribution of packet size values and the distribution of inter-arrival time values.

11. The traffic flow classifier of claim 10, wherein the machine learning module comprises a convolutional neural network configured to use at least the distribution of packet size values and distribution of inter-arrival time values as respective input channels.

12. The traffic flow classifier of claim 10, wherein the extracting module is further configured to determine at least one of:
    standard deviation of data packet size;
    average of data packet size;
    standard deviation of data packet inter-arrival time; and
    average of data packet inter-arrival time.

13. The traffic flow classifier of claim 10, wherein each of the preprocessing module, the extracting module, and the machine learning module is at least partially implemented by one or more processors executing respective instructions stored in one or more memories.

* * * * *